US010179741B2

(12) United States Patent
Parvulescu et al.

(10) Patent No.: US 10,179,741 B2
(45) Date of Patent: Jan. 15, 2019

(54) POST-TREATMENT OF DEBORONATED ZEOLITE BETA (71) Applicant: BASF SE, Ludwigshafen (DE)

(72) Inventors: Andrei-Nicolae Parvulescu, Ruppertsberg (DE); Jeff Yang, Mannheim (DE); Stefan Maurer, Ludwigshafen (DE); Manuela Gaab, Heidelberg (DE); Karsten Seidel, Mannheim (DE); Olga Gerlach, Ludwigshafen (DE); Ulrich Mueller, Neustadt (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/436,738

(22) PCT Filed: Oct. 9, 2013

(86) PCT No.: PCT/EP2013/071040
§ 371 (c)(1),
(2) Date: Apr. 17, 2015

(87) PCT Pub. No.: WO2014/060259
PCT Pub. Date: Apr. 24, 2014

(65) Prior Publication Data
US 2015/0344317 A1    Dec. 3, 2015

(30) Foreign Application Priority Data

Oct. 18, 2012  (EP) .................................. 12189036

(51) Int. Cl.
*C01B 39/02*     (2006.01)
*C01B 39/46*     (2006.01)
*B01J 29/70*     (2006.01)
*B01J 35/10*     (2006.01)

(52) U.S. Cl.
CPC ......... *C01B 39/026* (2013.01); *B01J 29/7007* (2013.01); *B01J 35/1014* (2013.01); *C01B 39/46* (2013.01); *B01J 2229/38* (2013.01)

(58) Field of Classification Search
None
See application file for complete search history.

(56) References Cited

U.S. PATENT DOCUMENTS

| | | | |
|---|---|---|---|
| 5,047,141 A * | 9/1991 | Chu ....................... B01J 29/035 208/114 |
| 5,200,168 A * | 4/1993 | Apelian ............... B01J 29/7007 423/714 |
| 5,324,702 A | 6/1994 | Yoo et al. |
| 5,508,019 A | 4/1996 | Saxton et al. |
| 5,573,585 A * | 11/1996 | Lauth ..................... C01B 37/04 106/400 |
| 5,723,710 A * | 3/1998 | Gajda .................. B01J 29/7007 585/446 |
| 2002/0164283 A1 | 11/2002 | Jones et al. |
| 2004/0014911 A1 | 1/2004 | Huffer et al. |
| 2005/0169836 A1 | 8/2005 | Jones et al. |
| 2007/0261995 A1* | 11/2007 | Corma Canos ........ B01D 53/02 208/310 Z |
| 2009/0325790 A1* | 12/2009 | Haller ................... C01B 37/005 502/241 |
| 2011/0108459 A1* | 5/2011 | Simon ................... B01J 29/084 208/89 |
| 2011/0132807 A1* | 6/2011 | Zhan ..................... B01J 29/166 208/111.01 |
| 2012/0259141 A1* | 10/2012 | Yilmaz ............... B01J 29/7007 568/319 |
| 2013/0184147 A1* | 7/2013 | Ryoo ..................... C01B 39/48 502/60 |

FOREIGN PATENT DOCUMENTS

| | | |
|---|---|---|
| CN | 1469843 A | 1/2004 |
| EP | 0 013 433 | 7/1980 |
| EP | 0 690 024 | 1/1996 |
| RU | 2 213 055 C2 | 9/2003 |
| RU | 2 283 277 C2 | 9/2006 |
| WO | 02/057181 | 7/2002 |
| WO | 2009 016153 | 2/2009 |

OTHER PUBLICATIONS

Waal, et al., "Synthesis of All-silica Zeolite Beta", Journal of the Chemical Society, Chemical Communications, (May 21, 1994), pp. 1241-1242, XP 000577187.
Koller, et al., "Variable anchoring of boron in zeolite beta", Microporous and Mesoporous Materials, vol. 79, No. 1-3, (Apr. 1, 2005), pp. 215-224, XP 002694823.
International Search Report dated Nov. 6, 2013 in PCT/EP13/071040 Filed Oct. 9, 2013.
Combined Chinese Office Action and Search Report dated May 17, 2016 in Patent Application No. 201380066254.7 (with English translation of categories of cited documents).
Zecchina et al., SIIIcaIIte Characterization. 2. IR Spectroscopy of the Interaction of CO with Internal and External Hydroxyl Groups, J. Phys. Chem. 96:4991-4997 (1992).

* cited by examiner

*Primary Examiner* — Sheng H Davis
(74) *Attorney, Agent, or Firm* — Oblon, McClelland, Maier & Neustadt, L.L.P.

(57) ABSTRACT

A process for the post-treatment of a zeolitic material having a BEA framework structure, the process comprising (i) providing a zeolitic material having a BEA framework structure, wherein the framework structure of the zeolitic material comprises $X_2O_3$ and $YO_2$, wherein Y is a tetravalent element and X is a trivalent element and wherein the molar ratio $X_2O_3:YO_2$ is greater than 0.02:1; (ii) treating the zeolitic material provided in (i) with a liquid solvent system thereby obtaining a zeolitic material having a molar ratio $X_2O_3:YO_2$ of at most 0.02:1, and at least partially separating the zeolitic material from the liquid solvent system; (iii) treating the zeolitic material obtained from (ii) with a liquid aqueous system having a pH in the range of 5.5 to 8 and a temperature of at least 75° C.

34 Claims, 1 Drawing Sheet

POST-TREATMENT OF DEBORONATED ZEOLITE BETA

The present invention relates to a process for the post-treatment of a zeolitic material having a BEA framework structure comprising $X_2O_3$ and $YO_2$, wherein a zeolitic material having a BEA framework structure is provided and then subjected to a treatment with a liquid solvent system followed by a treatment with a liquid aqueous system. Further, the present invention relates to a zeolitic material obtained or obtainable by this process. Also, the present invention relates to the use of said zeolitic material, in particular as a catalyst or a catalyst component.

Zeolites are widely used in the chemical industry, for example as heterogeneous catalysts for various chemical and petrochemical processes. Generally, zeolites are crystalline aluminosilicates having microporous structure. Their special properties, among others, are attributed to their porous structure, usually a regular pore system of molecular dimensions, and their specific chemical composition. There are many known zeolite structures, either naturally occurring zeolites or synthesized zeolites, which can be applied as heterogeneous catalysts for many types of applications.

In order to modify the properties of zeolitic materials such as their structure or their composition, post-treatment methods can be applied. The most common post-treatment methods described in the literature are steam treatments, acid treatments, or basic treatments.

Steam treatment is often used to enhance the activity and stability of the zeolite for various selective reactions. EP 0 013 433 A1, for example, teaches the use of steam treatment to increase the activity of a zeolite by increasing the Si/Al ratio. This steam treatment not only influences the Si/Al ratio, but also has an impact on the acidic/basic properties and the hydrophilicity/hydrophobicity of the zeolite.

Acid treatment may have a similar effect, and it may also result in the change of the framework composition. For example, WO 02/057181 A2 describes the deboronation of a silicate wherein an acid is employed for the deboronation stage. According to the specific examples of this document, glacial acetic acid is employed, and according to conceivable embodiments which are not further concretized, hydrochloric acid, sulfuric acid, nitric acid, phosphoric acid, formic acid, acetic acid, propionic acid, oxalic acid, and tartaric acid are described.

WO 2009/016153 A2 describes a combination of steam treatment and acid treatment. According to this document, phosphorus-modified molecular sieves are subjected to a steam treatment at high temperatures before a leaching step with an acidic solution is carried out to remove Al from the zeolitic material.

Both the steam treatment and the acid treatment have a significant influence on the properties of the zeolitic material. By subjecting a zeolitic material comprising both trivalent and tetravalent structural components X and Y as $X_2O_3$ and $YO_2$, respectively, to a steam and/or an acid treatment, the $X_2O_3:YO_2$ molar ratio is decreased. However, it was found that, for example, the crystallinity of the zeolitic materials may be decreased by the steam treatment and/or the acid treatment. Also, it was found that the hydrophobicity of the zeolitic materials, characterized by the water uptake of the zeolitic material, decreases. Therefore, both the steam treatment and the acid treatment are believed to result in a partial transformation of the zeolitic material into an amorphous material and to change the hydrophobicity.

Therefore, it was an object of the present invention to provide a process for the post-treatment of a zeolitic material which does not exhibit said disadvantage.

Further, it was an object of the present invention to provide a post-treated zeolitic material having a low $X_2O_3:YO_2$ molar ratio and simultaneously a high hydrophobicity. It was also an object of the present invention to provide a post-treated zeolitic material having a low $X_2O_3:YO_2$ molar ratio, a high hydrophobicity and at the same time a reduced concentration of internal defects such as silanol nests. In particular, it has been observed that the treatment of a zeolitic material for lowering the $X_2O_3:YO_2$ molar ratio such as by steam and/or acid treatment leads to the increased formation of silanol nests which are for example characterized by an absorption band in the IR spectrum of the zeolitic material located in the range of from 3500 to 3550 $cm^{-1}$. Within the meaning of the present invention, the term "silanol nests" preferably refers to hydrogen-bonded Si—OH groups of which the characteristic absorption in the IR spectra of e.g. silicalites is found in the range of 3200 to 3650 $cm^{-1}$, as described in Zecchina et al. in *J. Phys. Chem.* 1992, 96, pp. 4991-4997.

It was surprisingly found that a post-treatment process which includes subjecting a zeolitic material to a treatment with a liquid solvent system to decrease the molar ratio $X_2O_3:YO_2$ followed by a treatment with a liquid aqueous system having a pH in the range of 5.5 to 8 at elevated temperatures of at least 75° C. avoids that disadvantages. It was further surprisingly found that said treatment with the liquid aqueous system reduces the concentration of internal defects in the obtained zeolitic material.

Therefore, the present invention relates to a process for the post-treatment of a zeolitic material having a BEA framework structure, the process comprising (i) providing a zeolitic material having a BEA framework structure, wherein the framework structure of the zeolitic material comprises $X_2O_3$ and $YO_2$, wherein the molar ratio $X_2O_3:YO_2$ is greater than 0.02:1.

(ii) treating the zeolitic material provided in (i) with a liquid solvent system thereby obtaining a zeolitic material having a molar ratio $X_2O_3:YO_2$ of at most 0.02:1, and at least partially separating the zeolitic material from the liquid solvent system;

(iii) treating the zeolitic material obtained from (ii) with a liquid aqueous system having a pH in the range of 5.5 to 8 and a temperature of at least 75° C.;

wherein the pH of the aqueous system used in (iii) is determined using a pH sensitive glass electrode.

Step (i)

According to the present invention, $X_2O_3$ and $YO_2$ comprised in the BEA framework structure of the zeolitic material provided in (i) are contained therein as structure building elements, in contrast to non-framework elements which can be present in the pores and cavities formed by the framework structure.

Generally, there are no specific restrictions how the zeolitic material having a BEA framework structure is provided in (i). For example, it may be conceivable to purchase a suitable, commercially available zeolitic material having a BEA framework structure. Further, for example, any conceivable process for synthesizing such a zeolite can be employed for providing the zeolitic material. Preferably, the zeolitic material is provided by a process starting from suitable sources of $X_2O_3$ and $YO_2$ in the presence of a suitable template compound, also referred to as structure directing agent.

Generally, the framework structure of the zeolitic material provided in (i) comprises $X_2O_3$ and $YO_2$. Preferably, the suitable sources of $X_2O_3$ and $YO_2$ are employed in an amount so that at least 75 weight-%, more preferably at least 90 weight-%, more preferably at least 95 weight-%, more preferably at least 98 weight-%, more preferably at least 99 weight-% of the framework structure of the zeolitic material provided in (i) consist of $X_2O_3$ and $YO_2$.

Generally, $X_2O_3$ and $YO_2$ may be comprised in the zeolitic material having a BEA framework structure with a molar ratio $X_2O_3:YO_2$ of greater than 0.02:1, preferably at least 0.03:1, more preferably in the range of from 0.03:1 to 0.07:1, more preferably from 0.03:1 to 0.06:1, more preferably from 0.03:1 to 0.05:1.

While there are no specific restrictions concerning the chemical nature of tetravalent elements Y, preferred tetravalent elements Y according to the present invention include, but are not restricted to, Si, Sn, Ti, Zr, Ge, and combinations of two or more thereof. More preferably, Y is selected from the group consisting of Si, Sn, Ti, Zr, Ge, and combinations of two or more thereof. More preferably, Y is selected from the group consisting of Si, Sn, Ti, Zr, and combinations of two or more thereof. More preferably, Y is Si, Sn or a combination of Si and Sn. More preferably, Y is Si.

While there are no specific restrictions concerning the chemical nature of trivalent elements X, preferred trivalent elements according to the present invention include, but are not restricted to, Al, B, In, Ga, Fe, and combinations thereof. More preferably, X is selected from the group consisting of Al, B, In, Ga, Fe, and combinations of two or more thereof. More preferably, X is selected from the group consisting of Al, B, In, and combinations of two or more thereof. More preferably, X is Al, B, or a combination thereof. More preferably, X is B.

Therefore, the present invention relates to the process above, wherein Y is selected from the group consisting of Si, Sn, Ti, Zr, Ge, and combinations of two or more thereof, Y preferably being Si, and wherein X is selected from the group consisting of Al, B, In, Ga, Fe and combinations of two or more thereof, X preferably being B.

Therefore, according to a preferred embodiment, a zeolitic material is provided in (i), having a BEA framework structure, wherein at least 90 weight-%, more preferably at least 95 weight-%, more preferably at least 98 weight-%, more preferably at least 99 weight-% of the framework structure consists of $B_2O_3$ and $SiO_2$, and wherein the molar ratio $B_2O_3:SiO_2$ is greater than 0.02:1, more preferably at least 0.03:1, more preferably in the range of from 0.03:1 to 0.07:1, more preferably from 0.03:1 to 0.06:1, more preferably from 0.03:1 to 0.05:1. This material is also referred to as B-BEA.

Thus, according to a preferred embodiment of the present invention, a zeolitic material is provided in (i), having a BEA framework structure, wherein at least 95 weight-%, preferably at least 98 weight-% of the framework structure consists of $B_2O_3$ and $SiO_2$, and wherein the molar ratio $B_2O_3$ and $SiO_2$ is in the range of from 0.03:1 to 0.07:1, preferably from 0.03:1 to 0.06:1.

According to a preferred embodiment of the present invention, the zeolitic material provided in (i) is obtained by a synthetic method comprising
(1) preparing a mixture comprising at least one template compound, at least one source for $YO_2$ and at least one source for $X_2O_3$, and
(2) crystallizing the zeolitic material from the mixture prepared in (1).

According to the present invention, the at least one template compound used in (1) can be any suitable template compound (structure directing agent). Suitable template compounds include piperidine, hexamethylene imine, N,N,N-trimethyl-1-adamantammonium hydroxide, piperidine, hexamethylene imine, dibenzyl-1,4-diazabicyclo[2,2,2]octane, dibenzylmethylammonium, tetraethylammonium hydroxide and a mixture thereof. According to a preferred embodiment of the present invention, tetraethylammonium hydroxide is used.

Furthermore, $YO_2$ can be provided in (1) in any conceivable form, provided that a zeolitic material having a BEA framework structure comprising $YO_2$ can be crystallized in (2). Preferably, $YO_2$ is provided as such and/or as a compound which comprises $YO_2$ as a chemical moiety and/or as a compound which, partly or entirely, is chemically transformed to $YO_2$ during (1). In preferred embodiments of the present invention, wherein Y stands for Si or for a combination of Si with one or more further tetravalent elements, the source for $SiO_2$ provided in (1) can be any conceivable source. There can therefore be used, for example, all types of silica and silicates, preferably fumed silica, silica hydrosols, reactive amorphous solid silica, silica gel, silicic acid, water glass, sodium metasilicate hydrate, sesquisilicate or disilicate, colloidal silica, pyrogenic silica, silicic acid esters, or tetraalkoxysilanes, or mixtures of at least two of these compounds.

In preferred embodiments of the present invention, wherein the mixture according to (1) comprises at least one source for $SiO_2$, said source preferably comprises at least one compound selected from the group consisting of silica and silicates, preferably silicates, more preferably alkali metal silicates. Among the preferred alkali metal silicates, the at least one source preferably comprises water glass, more preferably sodium and/or potassium silicate, and more preferably sodium silicate. In particularly preferred embodiments of the present invention, the source for $SiO_2$ is sodium silicate. Furthermore, in embodiments comprising silica, fumed silica is preferred.

According to preferred embodiments of the present invention, wherein the zeolitic material having a BEA framework structure comprises $X_2O_3$, at least one source for $X_2O_3$ is provided in (1). In general, $X_2O_3$ can be provided in any conceivable form, provided that a zeolitic material having a BEA framework structure comprising $X_2O_3$ can be crystallized in (2). Preferably, $X_2O_3$ is provided as such and/or as a compound which comprises $X_2O_3$ as a chemical moiety and/or as a compound which, partly or entirely, is chemically transformed to $X_2O_3$ during the inventive process.

In more preferred embodiments of the present invention, wherein X stands for B or for a combination of B with one or more further trivalent elements, for example free boric acid and/or borates and/or boric esters, such as, for example, triethyl borate or trimethyl borate, can be used as starting materials and as the at least one source for $X_2O_3$, respectively.

There is no particular restriction according to the present invention as to the combinations of $X_2O_3$ and $YO_2$ which are comprised in the zeolitic material having a BEA framework structure. Thus, in principle, any conceivable combination of one or more tetravalent elements Y in $YO_2$ may be comprised in the zeolitic material in combination with one or more trivalent elements X in $X_2O_3$, wherein the aforementioned elements X and Y respectively refer to constitutive elements of the BEA framework structure.

In general, the crystallization procedure according to (2) can be conducted in any conceivable manner, provided that a zeolitic material having a BEA framework structure is crystallized from the mixture according to (1). The mixture can be crystallized in any type of vessel, wherein a means if agitation is preferably employed, preferably by rotation of the vessel and/or stirring, and more preferably by stirring the mixture.

Preferably, the mixture is heated during at least a portion of the crystallization process in (2). In general, the mixture can be heated to any conceivable temperature of crystallization, provided that a zeolitic material having a BEA framework structure is crystallized from the mixture. Preferably, the mixture is heated to a temperature of crystallization ranging from 80 to 200° C., more preferably from 90 to 190° C., more preferably from 100 to 185° C., more preferably from 120 to 180° C., more preferably from 140 to 175° C., even more preferably from 150 to 165° C.

The preferred heating in (2) of the present invention can be conducted in any conceivable manner suitable for the crystallization of a zeolitic material having a BEA framework structure. In general, heating may be conducted at one temperature of crystallization or vary between different temperatures. Preferably, a heat ramp is used for reaching the temperature of crystallization, wherein the heating rate preferably ranges from 5 to 100° C./h, more preferably from 10 to 70° C./h, more preferably from 15 to 50° C./h and even more preferably from 20 to 30° C./h.

In general, the duration of the crystallization process in (2) of the inventive process is not particularly limited. In preferred embodiments involving heating of the mixture according to (1), said crystallization process is conducted for a period ranging from 10 to 200 h, more preferably from 20 to 190 h, and even more preferably from 40 to 170 h. According to the inventive process, it is further preferred that crystallization is conducted for a period ranging from 60 to 160 h, more preferably from 80 to 150 h, and even more preferably from 110 to 130 h.

According to preferred embodiments of the present invention, wherein the mixture is heated in (2), said heating may be conducted during the entire crystallization process or during only one or more portions thereof, provided that a zeolitic material having the BEA framework structure is crystallized. Preferably, heating is conducted during the entire duration of crystallization.

In general, the process of the present invention can optionally comprise further steps for the work-up and/or further physical and/or chemical transformation of the zeolitic material having a BEA framework structure crystallized in (2) from the mixture provided in (1). The crystallized material can, for example, be subject to any sequence of isolation and/or washing procedures, wherein the zeolitic material obtained from crystallization in (2) is preferably subject to at least one isolation and at least one washing procedure.

Isolation of the crystallized zeolitic material can be achieved by any conceivable method. These methods include, for example, filtration, ultrafiltration, diafiltration and centrifugation and/or decantation methods or, for instance, spray-drying processes and spray granulation processes, wherein filtration methods can involve suction and/or pressure filtration steps. A combination of two or more of these methods can be applied.

With respect to one or more optional washing procedures, any conceivable solvent can be used. Washing agents which may be used are, for example, water, alcohols, such as methanol, ethanol or propanol, or mixtures of two or more thereof. Examples of mixtures are mixtures of two or more alcohols, such as methanol and ethanol or methanol and propanol or ethanol and propanol or methanol and ethanol and propanol, or mixtures of water and at least one alcohol, such as water and methanol or water and ethanol or water and propanol or water and methanol and ethanol or water and methanol and propanol or water and ethanol and propanol or water and methanol and ethanol and propanol. Water or a mixture of water and at least one alcohol, preferably water and ethanol, is preferred, distilled water being very particularly preferred as the only washing agent.

According to the present invention, the crystallized zeolitic material is preferably separated from the suspension by filtration to obtain a filter cake which is preferably subjected to washing, preferably with water. If washing is applied, it is preferred to continue the washing process until the washing water has a conductivity of at most 1,000 microSiemens/cm, more preferably of at most 850 microSiemens/cm, more preferably of at most 700 microSiemens/cm.

After separation of the zeolitic material from the suspension, preferably by filtration, and preferably after washing, the washed zeolitic material is optionally subjected to pre-drying, for example by subjecting to a suitable gas stream such as air, lean air, or technical nitrogen, for a time preferably in the range of from 4 to 10 h, more preferably from 5 to 8 h.

Then, the optionally the pre-dried filter cake is preferably dried. Preferably, drying is carried out at a temperature in the range of from 100 to 300° C., more preferably from 150 to 275° C., more preferably from 200 to 250° C. in a suitable atmosphere such as technical nitrogen, air, or lean air. Such drying can be accomplished, for example, in a suitable drying oven, or by spray-drying. If the drying is accomplished by spray-drying, the drying gas inlet temperature is preferably in the range of from 200 to 250° C., more preferably from 220 to 250° C., and the drying gas outlet temperature is preferably in the range of from 100 to 175° C., more preferably from 120 to 150° C. If spray-drying is carried out, it is conceivable to subject the mother liquor containing the zeolitic material, optionally after concentration, directly to spray-drying. Further, it is conceivable to subject the separated and washed zeolitic material to spray-drying, optionally after suitable re-suspending of the washed and optionally pre-dried zeolitic material.

Therefore, the present invention also relates to the process above, wherein prior to (ii), the zeolitic material provided in (i) is subjected to spray-drying, wherein during spray-drying, the drying gas inlet temperature is preferably in the range of from 200 to 250° C. and the drying gas outlet temperature is preferably in the range of from 100 to 175° C.

The preferred synthetic method preferably comprises calcination of the zeolitic material provided in (i), wherein the zeolitic material can be optionally subjected to spray-drying beforehand. According to a preferred embodiment of the present invention, prior to (ii), the zeolitic material provided in (i), optionally after spray-drying, is subjected to calcination. During calcination, the at least one template compounds is preferably at least partially, more preferably essentially removed from the framework structure.

The calcination generally involves the heating of the zeolitic material provided in (i) above a temperature of 350° C. The calcination procedure according to the present invention generally involves the heating of the zeolitic material provided in (i) at a temperature in the range of from 400 to 700° C., preferably from 450 to 550° C. in a suitable atmosphere such as technical nitrogen, air, or lean air. Furthermore, calcination procedure of the zeolitic material provided in (i) is carried out for a period in the range of from 1 to 10 h, preferably from 3 to 6 h. Thus, according to a preferred embodiment of the present invention, the calcination is carried out at a temperature in the range of from 400 to 700° C., preferably from 450 to 550° C., for a period in the range of from 1 to 10 h, preferably from 3 to 6 h.

According to the present invention, the crystallinity of the zeolitic material provided in (i) is not subject to any specific restrictions. As far as the crystallinity is concerned, the values referred to in the context of the present invention are to be understood as being determined according to the method as described in Reference Example 2. By way of example, the crystallinity of the zeolitic material provided in (i) may be in the range of from 40 to 100% such as from 50 to 90% or from 55 to 80%.

As far as the water uptake of the zeolitic material provided in (i) is concerned, the values referred to in the context of the present invention are to be understood as being determined according to the method as described in Reference Example 1. By way of example, the water uptake of the zeolitic material provided in (i) may be in the range of from 10 to 50 weight-% such as from 10 to 40 weight-% or from 10 to 30 weight-%.

Step (ii)

According to the present invention, the zeolitic material having a BEA framework structure, especially preferred the separated, spray-dried and calcined zeolitic material, provided in (i), is subjected to a treatment (ii) with a liquid solvent system wherefrom a zeolitic material having a molar ration $X_2O_3:YO_2$ of at most 0.02:1 is obtained, and wherein the zeolitic material is at least partially separated from the liquid solvent system.

Generally, no specific restrictions exist concerning the chemical nature of the liquid solvent system used in (ii). Thus, it may be conceivable to use an acidic aqueous system for decreasing the molar ratio $X_2O_3:YO_2$ of the zeolitic material provided in (i) to a value of at most 0.02:1. As acids, the liquid solvent system may comprise, for example, hydrochloric acid, sulfuric acid, nitric acid, phosphoric acid, formic acid, acetic acid, propionic acid, oxalic acid, or tartaric acid. Preferably, the liquid solvent system used in (ii) is selected from the group consisting of water, monohydric alcohols, polyhydric alcohols, and mixtures of two or more thereof. Concerning the monohydric alcohols and polyhydric alcohols, no specific restrictions exist. Preferably, these alcohols contain from 1 to 6 carbon atoms, more preferably from 1 to 5 carbon atoms, more preferably from 1 to 4 carbon atoms, and more preferably from 1 to 3 carbon atoms. The polyhydric alcohols preferably comprise from 2 to 5 hydroxyl groups, more preferably from 2 to 4 hydroxyl groups, preferably 2 or 3 hydroxyl groups. Especially preferred monohydric alcohols are methanol, ethanol, and propanol like 1-propanol and 2-propanol. Especially preferred polyhydric alcohols are ethane-1,2-diol, propane-1,2-diol, propane-1,3-diol, propane-1,2,3-triol. If mixtures of two or more of above-described compounds are employed, it is preferred that these mixtures comprise water and at least one monohydric and/or at least one polyhydric alcohol. Most preferably, the liquid solvent system consists of water. Therefore, the present invention relates to above-defined process and zeolitic material obtainable or obtained therefrom, wherein the liquid solvent system is selected from the group consisting of water, methanol, ethanol, propanol, ethane-1,2-diol, propane-1,2-diol, propane-1,3-diol, propane-1,2,3-triol, and mixtures of two or more thereof, preferably water.

Further, it is especially preferred that the liquid solvent system does not contain an inorganic acid or an organic acid or a salt thereof, the acid being selected from the group consisting of hydrochloric acid, sulfuric acid, nitric acid, phosphoric acid, formic acid, acetic acid, propionic acid, oxalic acid, and tartaric acid. Therefore, the present invention also relates to the process above, wherein the liquid solvent system is selected from the group consisting of water, methanol, ethanol, propanol, ethane-1,2-diol, propane-1,2-diol, propane-1,3-diol, propane-1,2,3-triol, and mixtures of two or more thereof, preferably water, and wherein the liquid solvent system does not contain an inorganic or organic acid, or a salt thereof, the acid being selected from the group consisting of hydrochloric acid, sulfuric acid, nitric acid, phosphoric acid, formic acid, acetic acid, propionic acid, oxalic acid, and tartaric acid. Even more preferably, the present invention also relates to the process above, wherein the liquid solvent system is selected from the group consisting of water, methanol, ethanol, propanol, ethane-1,2-diol, propane-1,2-diol, propane-1,3-diol, propane-1,2,3-triol, and mixtures of two or more thereof, preferably water, and wherein the liquid solvent system does not contain an inorganic or organic acid, or a salt thereof.

The reaction conditions according to (ii) are not specifically restricted, provided that the solvent system described above is in its liquid state and that the molar ratio $X_2O_3:YO_2$ is decreased to a value of at most 0.02:1. In particular, concerning the preferred temperatures described below, the skilled person will choose the respective pressure under which the treating is carried out in order to keep the solvent system in its liquid state.

Concerning the duration of the treating according to (ii), no specific restrictions exist. The above mentioned time is to be understood as the time where the liquid solvent system is maintained under the below described treating temperature. Preferably, in (ii), the treating is carried out for a period of from 6 to 20 h, more preferably from 7 to 17 h, more preferably from 8 to 12 h. The preferred treating temperatures are in the range of from 50 to 125° C., preferably from 90 to 115° C., more preferably from 95 to 105° C. Most preferably, the treating according to (ii) is carried out at the boiling point of the solvent system. If the solvent system is comprised of two or more components, the treating according to (ii) is preferably carried out at the boiling point of the component having the lowest boiling point.

According to a preferred embodiment of the present invention, the treating according to (ii) is carried out under reflux. Thus, the preferred vessel, representing an open system, used for the treating according to (ii) is preferably equipped with a reflux condenser. During (ii), the temperature of the liquid solvent system is kept essentially constant or changed, the treating with the liquid solvent system thus being carried out at two or more different temperatures. Most preferably, the temperature is kept essentially constant within the above-defined ranges.

Therefore, the present invention relates to the process above, comprising (ii) treating the zeolitic material provided in (i) with a liquid solvent system, preferably water, thereby obtaining a zeolitic material having a molar ratio $X_2O_3:YO_2$, preferably $B_2O_3:SiO_2$, of at most 0.02:1 in an open system under reflux at a temperature in the range of from 95 to 105° C., and at least partially separating the zeolitic material from the liquid solvent system.

As far as the amount of zeolitic material which is employed relative to the amount of liquid solvent system, no specific restrictions exist. Preferably, the weight ratio of zeolitic material relative to the liquid solvent system is in the range of from 1:5 to 1:50, more preferably from 1:10 to 1:35, more preferably from 1:10 to 1:20, even more preferably from 1:12 to 1:18.

During treating according to (ii), it is further preferred to suitably stir the liquid solvent system. During (ii), the stirring rate is kept essentially constant or changed, the treating thus being carried out at two or more different stirring rates. Most preferably, the zeolitic material is suspended in the liquid solvent system at a first stirring rate, and during (ii) at above-described temperatures, the stirring rate is changed, preferably increased. The stirring rates as such can be suitably chosen depending, for example, on the volume of the liquid solvent system, the amount of the zeolitic material employed, the desired temperature, and the like. Preferably, the stirring rate under which the zeolitic material is suspended in the liquid solvent system is in the range of from 5 to 200 r.p.m. (rounds per minute), more preferably from 10 to 200 r.p.m., more preferably from 20 to 55 r.p.m., more preferably from 30 to 50 r.p.m. The stirring rate under which the treating at the above-described temperatures is carried out is preferably in the range of from 50 to 100 r.p.m., more preferably from 55 to 90 r.p.m., more preferably from 60 to 80 r.p.m.

After the treating according to (ii), the obtained zeolitic material is separated from the suspension. All methods of separating the zeolitic material from the suspension are conceivable. These methods include, for example, filtration, ultrafiltration, diafiltration and centrifugation methods or, for instance, spray-drying processes and spray granulation processes, wherein filtration methods can involve suction and/or pressure filtration steps. A combination of two or more of these methods can be applied.

With respect to one or more optional washing procedures, any conceivable solvent can be used. Washing agents which may be used are, for example, water, alcohols, such as methanol, ethanol or propanol, or mixtures of two or more thereof. Examples of mixtures are mixtures of two or more alcohols, such as methanol and ethanol or methanol and propanol or ethanol and propanol or methanol and ethanol and propanol, or mixtures of water and at least one alcohol, such as water and methanol or water and ethanol or water and propanol or water and methanol and ethanol or water and methanol and propanol or water and ethanol and propanol or water and methanol and ethanol and propanol. Water or a mixture of water and at least one alcohol, preferably water and ethanol, is preferred, distilled water being very particularly preferred as the only washing agent. If washing as applied, it may be preferred to continue the washing process until the washing water has a conductivity of at most 1,000 microSiemens/cm, more preferably of at most 850 microSiemens/cm, more preferably of at most 700 microSiemens/cm.

According to the present invention, the zeolitic material is preferably separated from the suspension by filtration to obtain a filter cake which is preferably subjected to washing, preferably with water.

In general, the process of the present invention can optionally comprise further steps for the work-up and/or further physical and/or chemical transformation of the zeolitic material having a BEA framework structure obtained in (ii). The obtained zeolitic material can for example be subject to any sequence of isolation and/or washing procedures, wherein the zeolitic material is preferably subject to at least one isolation and at least one washing procedure.

After separation of the zeolitic material having a BEA framework structure from the suspension, preferably achieved by filtration, and after washing, the zeolitic material obtained in (ii) is optionally subjected to drying. The drying procedure can optionally comprise one or more drying steps. In general, any conceivable means of drying can be used. Drying procedures preferably include heating and/or applying vacuum to the zeolitic material having a BEA framework structure.

Preferably, the separated and washed zeolitic material is subjected to drying, for example by subjecting the filter cake to a suitable gas stream, such as air, lean air, or nitrogen, for a time preferably in the range of from 4 to 10 h, more preferably from 5 to 8 h.

It is further preferred that, prior to (iii), the zeolitic material obtained from the treating according to (ii) is subjected to spray-drying. If the drying is accomplished by spray-drying, the drying gas inlet temperature is preferably in the range of from 200 to 250° C., more preferably from 220 to 250° C., and the drying gas outlet temperature is preferably in the range of from 100 to 175° C., more preferably from 120 to 150° C. If spray-drying is carried out, it is conceivable to subject the mother liquor containing the zeolitic material, optionally after concentration, directly to spray-drying. Further, it is conceivable to subject the separated and washed zeolitic material to spray-drying, optionally after suitable re-suspending of the washed and optionally pre-dried zeolitic material.

According to an especially preferred embodiment of the present invention, the zeolitic material obtained from (ii) is in the form of a powder, preferably in the form of a spray powder wherein the spray-powder may result either from spray-drying in (i) and/or spray-drying in (ii).

According to (ii), the preferably dried zeolitic material is optionally subjected to calcination. Preferably, the calcination is carried out in a suitable atmosphere such as air, lean air, or nitrogen at a temperature in the range of from 400 to 700° C., preferably from 500 to 600° C., for a period in the range of from 1 to 10 h, preferably from 2 to 6 h.

According to a preferred embodiment of the present invention, the zeolitic material obtained in (ii) is not subjected to calcination prior to (iii).

According to the present invention, the treatment according to (ii) with the liquid solvent system decreases the molar ratio $X_2O_3:YO_2$ of the zeolitic material; thus, it is a procedure for removing at least a portion of X from the BEA framework structure. Therefore, the molar ratio $X_2O_3:YO_2$ of the zeolitic material having a BEA framework structure obtained from (ii) is higher than the molar ratio $X_2O_3:YO_2$ of the zeolitic material having a BEA framework structure provided in (i). According to a preferred embodiment of the present invention, the molar ratio $X_2O_3:YO_2$ obtained in (ii) is at most 0.02:1, preferably at most 0.01:1, more preferably in the range of from 0.0005:1 to 0.01:1, more preferably from 0.0009:1 to 0.003:1.

Step (iii)

After (ii), the zeolitic material having a BEA framework structure, preferably the separated and dried zeolitic material having a BEA framework structure is subjected to a treatment with a liquid aqueous system having a pH in the range of 5.5 to 8 and a temperature of at least 75° C.

According to the present invention, any conceivable amount of water can be contained in the liquid aqueous system, provided that the water content of the liquid aqueous system is greater than 50 weight-% and the pH of the liquid aqueous system is in the above-mentioned range. Generally, the amount of water contained in the liquid aqueous system is at least 85 weight-%, preferably at least 90 weight-%, more preferably at least 95 weight-%, more preferably, at least 99 weight-%, even more preferably at least 99.9 weight-%. Even more preferably, the liquid aqueous system used in (iii) essentially consists of water, and may only contain certain impurities which are contained in the water, preferably contained in the preferably used deionized water. Thus, according to a preferred embodiment of the present invention, in (iii), the liquid aqueous system comprises at least 90 weight-%, preferably al least 99 weight-%, more preferably at least 99.9 weight-% water.

Concerning the pH of the aqueous system used in (iii), a pH in the range of from 5.5 to 8 is preferred. The pH of the liquid aqueous system is determined using a pH sensitive glass electrode. According to a further preferred embodiment of the present invention, the liquid aqueous system used in (iii) has a pH in the range of from 6 to 7.5, preferably from 6.5 to 7.5.

Concerning the duration of the treatment with the liquid aqueous system according to (iii), no particular restrictions exist. Preferably, in (iii), the zeolitic material is treated with the liquid aqueous system for a period in the range of from 0.5 to 24 h, preferably from 1 to 18 h, more preferably from 8 to 14 h.

Further, no particular restrictions exist concerning the temperature of the liquid aqueous system, provided that the aqueous system is in its liquid state. Therefore, concerning the preferred temperatures described below, the skilled person will choose the respective pressure under which the treating according to (ii) is carried out in order to keep the solvent system in its liquid state.

Preferably, in (iii), the zeolitic material is treated with the liquid aqueous system at a temperature in the range of from 75 to 200° C., preferably from 90 to 180° C., more preferably from 100 to 160° C., more preferably from 110 to 160° C., more preferably from 110 to 150° C.

While concerning the type of vessel in which heating in (iii) is conducted, no particular restrictions exist, the vessel is suitably selected to allow to treat the zeolitic material at the temperatures described above, at which temperatures the aqueous system is in its liquid state. Therefore, as far as higher temperatures are concerned, the treatment according to (iii) is carried out in a closed system under autogenous pressure.

According to a conceivable embodiment of the present invention, heating in (iii) is conducted in an open system. In this case, the reaction conditions are restricted by the temperature as the treating is carried out below the boiling temperature of the employed aqueous system in order to keep the aqueous system in its liquid state.

According to a preferred embodiment, heating in (iii) is conducted in a closed system. Thus, heating in (iii) is preferably conducted under solvothermal conditions, meaning that the zeolitic material is treated with the liquid aqueous system under autogenous pressure of the liquid aqueous system, for example in an autoclave or other vessels suited for generating solvothermal conditions.

Therefore, according to a particular preferred embodiment of the present invention, in (iii), the zeolitic material is treated with the liquid aqueous system in a closed system, preferably an autoclave, under autogenous pressure.

Consequently, according to a preferred embodiment of the present invention, treating according to (ii) is carried out in an open system, preferably under reflux, and treating according to (iii) is carried out in a closed system, preferably under autogeneous pressure wherein in (ii), the solvent system is in its liquid state and in (iii), the aqueous system is in its liquid state.

Therefore, the present invention also relates to the process as defined above, comprising
(ii) treating the zeolitic material provided in (i) with a liquid solvent system, preferably water, thereby obtaining a zeolitic material having a molar ratio $X_2O_3:YO_2$, preferably $B_2O_3:SiO_2$, of at most 0.02:1, in an open system under reflux at a temperature in the range of from 95 to 105° C., and at least partially separating the zeolitic material from the liquid solvent system;
(iii) treating the zeolitic material obtained from (ii) with a liquid aqueous system, preferably water, having a pH in the range of 6.5 to 7.5 and a temperature in the range of from 110 to 160° C. in a closed system under autogenous pressure.

During treating according to (iii), it is further preferred to suitably stir the liquid aqueous system. During (iii), the stirring rate is kept essentially constant or changed, the treating thus being carried out at two or more different stirring rates. The stirring rates as such can be suitably chosen depending, for example, on the volume of the liquid aqueous system, the amount of the zeolitic material employed, the desired temperature, and the like. Preferably, the stirring rate used in (iii) is in the range of from 10 to 200 r.p.m. (rounds per minute), more preferably from 50 to 180 r.p.m., more preferably from 80 to 160 r.p.m., more preferably from 110 to 130 r.p.m.

As far as the amount of the liquid aqueous system used in (iii) relative to the amount of the zeolitic material which is employed, no specific restrictions exist. Preferably, in (iii), the weight ratio of the liquid aqueous system relative to the zeolitic material is in the range of from 35:1 to 5:1, preferably from 30:1 to 10:1, more preferably from 25:1 to 15:1.

After the treatment according to (iii), the zeolitic material having a BEA framework structure is preferably separated from the suspension. Separation of the zeolitic material can be achieved by any conceivable method including, for example, filtration, ultrafiltration, diafiltration and centrifugation and/or decantation methods, wherein filtration methods can involve suction and/or pressure filtration steps. Subsequently, the separated zeolitic material is subjected to one ore more optional washing procedures. Washing agents which may be used are, for example, water, alcohols, such as methanol, ethanol or propanol, or mixtures of two or more thereof. Examples of mixtures are mixtures of two or more alcohols, such as methanol and ethanol or methanol and propanol or ethanol and propanol or methanol and ethanol and propanol, or mixtures of water and at least one alcohol, such as water and methanol or water and ethanol or water and propanol or water and methanol and ethanol or water and methanol and propanol or water and ethanol and propanol or water and methanol and ethanol and propanol. Water or a mixture of water and at least one alcohol, preferably water and ethanol, is preferred, distilled water being very particularly preferred as the only washing agent. If washing is applied, it may be preferred to continue the washing process until the washing water has a conductivity of at most 1,000 microSiemens/cm, more preferably of at most 850 microSiemens/cm, more preferably of at most 700 microSiemens/cm.

According to the present invention, the zeolitic material is preferably separated from the suspension by filtration to obtain a filter cake which is preferably subjected to washing, preferably with distilled water.

In general, the process of the present invention can optionally comprise further steps for the work-up and/or further physical and/or chemical transformation of the zeolitic material having a BEA framework structure obtained in (iii). The obtained zeolitic material can, for example, be subject to any sequence of isolation and/or washing procedures, wherein the zeolitic material obtained from (iii) is preferably subject to at least one isolation and at least one washing procedure.

After separation of the zeolitic material having a BEA framework structure from the suspension, preferably achieved by filtration, and after washing, the zeolitic material obtained in (iii) is subjected to at least one drying step. The drying procedure can optionally comprise one or more drying steps. In general, any conceivable means of drying can be used. Drying procedures preferably include heating and/or applying vacuum to the zeolitic material having a BEA framework structure.

After separation of the zeolitic material having a BEA framework structure from the suspension, preferably achieved via filtration, and after washing, the washed filter cake containing the zeolitic material having a BEA framework structure is optionally subjected to drying, for example by subjecting the filter cake to a suitable gas stream, preferably a nitrogen stream. Thus, according to a particular preferred embodiment of the present invention in (iii), the zeolitic material is subjected to drying. Concerning the duration and the temperature of drying no specific restrictions exist. Preferably, drying is carried out in a suitable atmosphere such as air, lean air, or nitrogen, at a temperature in the range of from 100 to 180° C., preferably from 120 to 150° C., for a period in the range of from 10 to 70 h, preferably from 15 to 25 h.

After separation of the zeolitic material from the suspension, preferably by filtration, and preferably after washing, and prior to drying, the washed zeolitic material can be subjected to pre-drying, for example by subjecting to a suitable gas stream such as air, lean air, or nitrogen, for a time preferably in the range of from 4 to 10 h, more preferably from 5 to 8 h.

Further, according to a preferred embodiment of the invention, the zeolitic material, optionally after drying, is subjected to calcination in (iii). Preferably, calcination is carried out at a temperature in the range of from 350 to 600° C., preferably from 400 to 500° C., for a period in the range of from 1 to 10 h, preferably from 2 to 7 h. Suitable calcination atmospheres include nitrogen, air, or lean air.

According to a particular preferred embodiment of the present invention, after (i) and/or after (ii) and/or after (iii), the zeolitic material is, prior to calcination, subjected to drying, wherein drying is preferably carried out at a temperature in the range of from 100 to 180° C., preferably from 120 to 150° C., for a period in the range of from 10 to 70 h, preferably from 15 to 25 h.

Surprisingly, it was found that by the process according to the present invention, a zeolitic material with a decreased molar ratio $X_2O_3:YO_2$ relative to the zeolitic material provided in (i) could be obtained wherein, at the same time, the hydrophobicity of the zeolitic material, characterized by water uptake measurements as described herein, can be kept constant or even be increased. Such an increase in the hydrophobicity is desired for many potential uses of the zeolitic material such catalytically active materials. Therefore, the combination of the deboronation step according to (ii) and the subsequent treatment with the liquid aqueous system was found to overcome the disadvantages of the prior art processes. Thus, according to the present invention, the water uptake of the zeolitic material obtained from (iii) is lower than the water uptake of the zeolitic material provided in (ii). Preferably, the water uptake of the zeolitic material obtained from (iii) is at least 40%, preferably at least 50%, more preferably at least 55%, even more preferably at least 60% lower than the water uptake of the zeolitic material provided in (i).

Further, it was found that the treating with a liquid aqueous system according to (iii) has an influence on the specific surface area of the zeolitic material. Preferably, the specific surface area of the zeolitic material obtained from (iii) is at least 100 m²/g, preferably at least 200 m²/g lower than the specific surface area of the zeolitic material obtained from (ii). The term "specific surface area" as used in this context of the present application relates to the multipoint BET specific surface area, which is determined via nitrogen adsorption according to DIN 66131.

Yet further, it was surprisingly found that the additional treatment with a liquid aqueous system according to (iii) of the inventive process has a positive influence on the silanol group characteristics of the zeolitic material. In particular, in the infrared spectrum of the zeolitic material of the present invention, a first type of silanol groups is represented by a first absorption band with a maximum in the region of from 3701 to 3741 cm$^{-1}$, wherein said first absorption band may be attributed to surface silanol groups, and a second type of silanol groups is represented by a second absorption band with a maximum in the region of from 3500 to 3550 cm$^{-1}$, wherein said second absorption band may be attributed to silanol nests. Again, within the meaning of the present invention, the term "surface silanol" or "surface silanol groups" preferably refers to Si—OH groups which are not hydrogen-bonded and of which the characteristic absorption in the IR spectra of e.g. silicalites is found in the range of 3650 to 3800 cm$^{-1}$, as described in Zecchina et al. in *J. Phys. Chem.* 1992, 96, pp. 4991-4997. More specifically, it may be observed that the treatment of a zeolitic material for lowering the $X_2O_3:YO_2$ molar ratio such as by steam and/or acid treatment leads to the increased formation of silanol nests characterized by an increase in intensity of the second absorption band, whereas the concentration of surface silanol groups reflected by the intensity of the first absorption band remains comparably constant upon treatment for the lowering of the $X_2O_3:YO_2$ molar ratio. As a result, the intensity ratio of the first absorption band to the second absorption band obtained from the evaluation of a given IR spectrum of a zeolitic material constitutes a reliable indicator as to the relative concentration of silanol nests in a given zeolitic material, and in particular as to changes in the silanol nest concentration upon treatment of the zeolitic material, e.g. as a result of steam and/or acid treatment thereof. More specifically, a decrease in the intensity ratio of the first absorption band to the second absorption is indicative of an increase in the relative concentration of the silanol nests in the zeolitic material whereas an increase thereof accordingly reflects a decrease in the relative concentration of the silanol nests.

Thus, according to the present invention, it was found that the intensity ratio of the IR band representing the silanol groups of the first type relative to the IR band representing the silanol groups of the second type of the zeolitic material obtained in (iii) is at least 5%, preferably at least 10%, more preferably at least 20%, more preferably at least 30%, more preferably at least 50%, more preferably 60%, and more preferably 70% higher than the respective ratio of the zeolitic material obtained in (ii). As noted above, concerning the intensity ratio of the first IR absorption band to the second IR absorption band, an increase of said ratio indicates a decrease in the relative concentration of internal defects (i.e., silanol nests) in the zeolitic material, which is induced by the treatment with a liquid aqueous system in (iii). Consequently, the surprising technical effect of the inventive process may be observed by observing the evolution of the intensity ratio of the aforementioned bands in the IR spectrum of the zeolitic material prior to and after the treatment of step (iii), wherein the increase in said ratio which may be observed in said step indicates the surprising regenerative effects provided by the inventive process after degradation of the zeolitic structure as a result of the treatment in step (ii) for removing $X_2O_3$ from the zeolite framework, for example by steam and/or acid treatment.

Further, it was found that by the treatment with a liquid aqueous system according to (iii) of the inventive process, the crystallinity of the zeolitic material obtained in (ii) may be kept constant or slightly decreased. In particular, the hydrothermal treatment showed little influence of the crystallinity of the zeolitic material such that the initial crystallinity of the zeolitic material obtained in (ii) could be maintained to a large extent. By way of example, the crystallinity of the zeolitic material obtained from (iii), as determined via XRD analysis, may be less than 30%, preferably less than 20%, more preferably less than 15%, more preferably less than 10%, more preferably less than 5%, more preferably less than 2%, and more preferably less than 1% lower than the crystallinity of the zeolitic material obtained in (ii).

Especially preferably, the process of the present invention does not comprise a steam treatment, in particular a water steam treatment, neither prior to, nor during, nor after (iii). Thus, preferably, the zeolitic material obtained from the inventive process is not subjected to a steam treatment during the entire process.

Further preferably, the process of the present invention does not comprise a treatment of the zeolitic material with an aqueous solution having a pH below 5.5 or above 8, neither prior to, nor during, nor after (iii). Thus, preferably, the zeolitic material obtained from the inventive process is not subjected to an acid treatment or a base treatment during the entire process.

The present invention further relates to a zeolitic material which is obtainable or obtained by the process according to the present invention.

Preferred Zeolitic Materials

As mentioned above, the process according to the present invention exhibits major advantages in particular regarding the hydrophobicity of the zeolitic materials, which materials are preferably a powder or a spray powder, having a lower molar ratio $X_2O_3:YO_2$ relative to the starting zeolitic material. As defined above, Y is preferably selected from the group consisting of Si, Sn, Ti, Zr, Ge, and combinations of two or more thereof, Y preferably being Si, and X is preferably selected from the group consisting of Al, B, In, Ga, Fe and combinations of two or more thereof, X preferably being B.

Therefore, the present invention also relates to a zeolitic material having a BEA framework structure, wherein the framework structure comprises $YO_2$ and $X_2O_3$, wherein Y is a tetravalent element and X is a trivalent element, said zeolitic material have a molar ratio $X_2O_3:YO_2$ of at most 0.02:1, preferably at most 0.002:1, and a water uptake of at most 7 weight-%, preferably of to most 6 weight-%, wherein preferably at least 95 weight-%, more preferably at least 98 weight-%, more preferably at least 99 weight-% of the framework structure of the zeolitic material consist of $X_2O_3$ and $YO_2$. In particular, the present invention relates to a zeolitic material having a BEA framework structure, wherein the framework structure comprises $SiO_2$ and $B_2O_3$, said zeolitic material have a molar ratio $B_2O_3:SiO_2$ of at most 0.02:1, preferably at most 0.002:1, and a water uptake of at most 7 weight-%, preferably at most 6 weight-%, and wherein preferably at least 95 weight-%, more preferably at least 98 weight-%, more preferably at least 99 weight-% of the framework structure of the zeolitic material consist of $B_2O_3$ and $SiO_2$.

Preferably, the molar ratio $X_2O_3:YO_2$, preferably the molar ratio $B_2O_3:SiO_2$, is at most 0.002:1, more preferably in the range of from 0.0001:1 to 0.002:1, more preferably from 0.0005:1 to 0.002:1, and the water uptake of the zeolitic material is in the range of from 3 to 7 weight-%, preferably from 4 to 6 weight-%.

Still further, it was found that the inventive zeolitic materials are preferably characterized by an infrared spectrum which exhibits a first type of silanol groups which are represented by a first absorption band with a maximum in the region of from 3701 to 3741 cm$^{-1}$, and a second type of silanol groups which are represented by a second absorption band with a maximum in the region of from 3500 to 3550 cm$^{-1}$. Preferably, the intensity of said first absorption band relative to the intensity of said second absorption band is at least 1.0, preferably in the range of from 1.0 to 3.0, more preferably in the range of from 1.3 to 2.2, more preferably in the range of from 1.2 to 2.8, more preferably in the range of from 1.4 to 2.6, more preferably in the range of from 1.5 to 2.5, more preferably in the range of 1.6 to 2.4, more preferably in the range of from 1.7 to 2.3, and more preferably in the range of from 1.8 to 2.2.

Yet further, it was found that the inventive zeolitic materials are preferably characterized by a crystallinity as determined by XRD analysis, of at least 60%, preferably in the range of from 60 to 90%, more preferably in the range of from 65 to 80%.

Yet further, it was found that the inventive zeolitic materials are preferably characterized by a specific surface are (BET surface) of at most 600 m$^2$/g, preferably in the range of from 60 to 600 m$^2$/g, more preferably from 100 to 600$^2$/g, more preferably from 200 to 600 m$^2$/g, as determined according to DIN 66131.

Preferred Uses

The zeolitic material having a BEA framework structure according to the invention, preferably obtainable or obtained by the process according to the invention, is preferably used as catalyst, as catalyst support, or as catalyst component. By way of example, the use as a noble metal catalyst support in diesel oxidation catalysts (DOC) or the use as washcoat component in a DOC may be mentioned. Further, the zeolitic material according to the invention, preferably obtained by the process according to the invention, can be used as a catalyst in hydration or dehydration reactions such as isopropanol dehydration. Still further, it can be used as a molecular sieve, an adsorbent, or a filler.

Therefore, the present invention also relates to a catalytic process, wherein a zeolitic material according to the present invention or obtainable or obtained according to the process of the present invention is employed as a catalyst, as a catalyst support or as a catalyst component.

Generally, and in particular in case the inventive zeolitic material is used as catalyst, it is possible to prepare a molding comprising the zeolitic material, for example by suitably mixing the zeolitic material with at least one binder and/or with at least one binder precursor, and optionally at least one pore-forming agent and/or at least one plasticizing agent. The moldings may be shaped in every conceivable geometry such as strands, for example having rectangular, triangular hexagonal, quadratic, oval, or circular cross-section, stars, tablets, spheres, hollow cylinders, and the like. Examples of such binders are metal oxides, such as, for example, $SiO_2$, $Al_2O_3$, $TiO_2$, $ZrO_2$ or MgO or clays or mixtures of two or more of these oxides or mixed oxides of at least two of Si, Al, Ti, Zr, and Mg. Pore-forming agent such as mesopore-forming agents include polymeric vinyl compounds, such as polyalkylene oxides like polyethylene oxides, polystyrene, polyacrylates, polymethacrylates, polyolefins, polyamides and polyesters.

Pasting agents include organic, in particular hydrophilic polymers, such as carbohydrates like cellulose, cellulose derivatives, such as methyl cellulose, and starch, such as potato starch, wallpaper plaster, polyacrylates, polymethacrylates, polyvinyl alcohol, polyvinylpyrrolidone, polyisobutene or polytetrahydrofuran. The use of water, alcohols or glycols or mixtures thereof, such as mixtures of water and alcohol, or water and glycol, such as for example water and methanol, or water and ethanol, or water and propanol, or water and propylenglycol, as pasting agents may be mentioned.

The present invention is illustrated by the following examples.

EXAMPLES

Reference Example 1: Determination of the Water Uptake

Water adsorption/desorption isotherms were performed on a VTI SA instrument from TA Instruments following a step-isotherm program. The experiment consisted of a run or a series of runs performed on a sample material that has been placed on the microbalance pan inside of the instrument. Before the measurement was started, the residual moisture of the sample was removed by heating the sample to 100° C. (heating ramp of 5° C./min) and holding it for 6 h under a nitrogen flow. After the drying program, the temperature in the cell was decreased to 25° C. and kept constant during the measurement. The microbalance was calibrated, and the weight of the dried sample was balanced (maximum mass deviation 0.01 wt.-%). Water uptake of a sample was measured as the increase in weight compared to the dry sample. First, an adsorption curve was measured by increasing the relative humidity (RH) (expressed as weight-% water in the atmosphere inside of the cell) to which the sample was exposed and measuring the water uptake by the sample as equilibrium. The RH was increased with a step of 10% from 5% to 85% and at each step the system controlled the RH and monitored the weight of the sample until reaching the equilibrium conditions after the sample and recording the weight uptake. The total adsorbed water of the sample was taken after the sample was exposed to the 85 weight-% RH. During the desorption measurement, the RH was decreased from 85 weight-% to 5 weight-% with a step of 10% and the change in the weight of the sample (water uptake) was monitored and recorded.

Reference Example 2: Determination of the Crystallinity

The crystallinity of the zeolitic materials according to the present invention was determined by XRD analysis, wherein the crystallinity of a given material is expressed relative to a reference zeolitic material wherein the reflecting surfaces of the two zeolitic materials are compared. The reference zeolitic material having a crystallinity of 100% was zeolite ammonium beta powder commercially available under the CAS registry number 1318-02-1. The determination of the crystallinity was performed on a D8 Advance series 2 diffractometer from Bruker AXS. The diffractometer was configured with an opening of the divergence aperture of 0.1° and a Lynxeye detector. The samples as well as the reference zeolitic material were measured in the range from 19° to 25° (2 Theta). After baseline correction, the reflecting surfaces were determined by making use of the evaluation software EVA (from Bruker AXS). The ratios of the reflecting surfaces are given as percentage values.

Reference Example 3: IR Measurements

The IR measurements were performed on a Nicolet 6700 spectrometer. The zeolitic materials were pressed into a self-supporting pellet without the use of any additives. The pellet was introduced into a high vacuum cell placed into the IR instrument. Prior to the measurement the sample was pretreated in high vacuum ($10^{-5}$ mbar) for 3 h at 300° C. The spectra were collected after cooling the cell to 50° C. The spectra were recorded in the range of 4000 $cm^{-1}$ to 800 $cm^{-1}$ at a resolution of 2 $cm^{-1}$. The obtained spectra were represented by a plot having on the x axis the wavenumber ($cm^{-1}$) and on the y axis the absorbance (arbitrary units). For the quantitative determination of the peak heights and the ratio between the peaks a baseline correction was carried out. Changes in the 3000 to 3900 $cm^{-1}$ region were analyzed and for comparing multiple samples, the band at 1800±5 $cm^{-1}$ was taken as reference.

Example 1

(i) Providing a Starting Material (Zeolitic Material of Framework Structure BEA)

209 kg de-ionized water were provided in a vessel. Under stirring at 120 rpm (rounds per minute), 355 kg tetraethylammonium hydroxide were added and the suspension was stirred for 10 minutes at room temperature. Thereafter, 61 kg boric acid were suspended in the water and the suspension was stirred for another 30 minutes at room temperature. Subsequently, 555 kg Ludox® AS-40 were added, and the resulting mixture was stirred at 70 rpm for another hour at room temperature. The liquid gel had a pH of 11.8 as determined via measurement with a pH electrode. The finally obtained mixture was transferred to a crystallization vessel and heated to 160° C. within 6 h under a pressure of 7.2 bar and under stirring (140 rpm). Subsequently, the mixture was cooled to room temperature. The mixture was again heated to 160° C. within 6 h and stirred at 140 rpm for additional 55 h. The mixture was cooled to room temperature and subsequently, the mixture was heated for additional 45 h at a temperature of 160° C. under stirring at 140 rpm. 7800 kg de ionized water were added to 380 kg of this suspension. The suspension was stirred at 70 rpm and 100 kg of a 10 wt-% $HNO_3$ aqueous solution was added. From this suspension the boron containing zeolitic material having a BEA framework structure was separated by filtration. The filter cake was then washed with de-ionized water at room temperature until the washing water had a conductivity of less than 150 microSiemens/cm. The thus obtained filter cake was subjected to drying in a nitrogen stream.

The thus obtained filter cake was admixed with water to obtain a suspension having a solid content of 40 weight-%. This suspension was subjected to spray-drying in a spray-tower with the following spray-drying conditions:
drying gas, nozzle gas: technical nitrogen
temperature drying gas:
  temperature spray tower (in): 235° C.
  temperature spray tower (out): 140° C.
nozzle:
  top-component nozzle supplier Gerig; size 0
  nozzle gas temperature: room temperature
  nozzle gas pressure: 1 bar
operation mode: nitrogen straight
apparatus used: spray tower with one nozzle
configuration: spray tower—filter—scrubber
gas flow: 1,500 kg/h
filter material: Nomex® needle-felt 20 m²
dosage via flexible tube pump: SP VF 15 (supplier: Verder)

The spray tower was comprised of a vertically arranged cylinder having a length of 2,650 mm, a diameter of 1,200 mm, which cylinder was conically narrowed at the bottom. The length of the conus was 600 mm. At the head of the cylinder, the atomizing means (a two-component nozzle) were arranged. The spray-dried material was separated from the drying gas in a filter downstream of the spray tower, and the drying gas was then passed through a scrubber. The suspension was passed through the inner opening of the nozzle, and the nozzle gas was passed through the ring-shaped slit encircling the opening.

The spray-dried material was then subjected to calcination at 500° C. for 5 h. The calcined material had a $B_2O_3$:$SiO_2$ molar ratio of 0.045, a crystallinity of 100 and a water uptake of 20.9 weight-%. The IR spectrum of the obtained product exhibits a first absorption band with the maximum in the range of from 3701 $cm^{-1}$ to 3741 $cm^{-1}$ and a second absorption band with the maximum in the range of from 3500 $cm^{-1}$ to 3550 $cm^{-1}$, wherein the ratio of the intensity of the first absorption band relative to the intensity of the second absorption band is 2.97.

(ii) Treatment with a Liquid Solvent System—Deboronation 840 kg de-ionized water were provided in a vessel equipped with a reflux condenser. Under stirring at 40 rpm, 28 kg of the spray-dried material obtained according to (i) were employed. Subsequently, the vessel was closed and the reflux condenser put into operation. The stirring rate was increased to 70 rpm. Under stirring at 70 rpm, the content of the vessel was heated to 100° C. within 1 h and kept at this temperature for 20 h. Then, the content of the vessel was cooled to a temperature of less than 50° C.

The resulting deboronated zeolitic material of structure type BEA was separated from the suspension by filtration under a nitrogen pressure of 2.5 bar and washed four times with deionized water at room temperature. After the filtration, the filter cake was dried in a nitrogen stream for 6 h.

The obtained deboronated zeolitic material was subjected to spray-drying under the conditions as described in (i).

The obtained deboronated zeolitic material had a $B_2O_3$:$SiO_2$ molar ratio of less than 0.002, a crystallinity of 77% and a water uptake of 15 weight-%. The IR spectrum of the obtained deboronated product exhibits a first absorption band with the maximum in the range of from 3701 $cm^{-1}$ to 3741 $cm^{-1}$ and a second absorption band with the maximum in the range of from 3500 $cm^{-1}$ to 3550 $cm^{-1}$, wherein the ratio of the intensity of the first absorption band relative to the intensity of the second absorption band is 1.27.

Compared to the starting zeolitic material obtained in (i), the deboronated zeolitic material displays a decreased $B_2O_3$:$SiO_2$ molar ratio (i.e., from initially 0.045 to less than 0.002), a decreased crystallinity (i.e., from initially 100% to 77%), and a decreased water uptake (i.e., from initially 20.9 weight-% to 15 weight-%). Furthermore, the ratio of the intensity of the first absorption band relative to the intensity of the second absorption band in the IR spectrum is decreased from 2.97 to 1.27, indicating that a considerable amount of internal defects (i.e., silanol nests) within the zeolitic material have been created as a result of the deboronation process.

(iii) Treatment with a Liquid Aqueous System 1600 g de-ionized water were provided in a vessel and 80 g of the deboronated zeolitic material obtained (ii) were added under stirring. The suspension was stirred for 10 min at room temperature. Thereafter, the suspension was heated at 140° C. under autogenous pressure for 12 h.

The resulting zeolitic material was separated from the suspension by filtration and washed with deionized water at room temperature. After the filtration, the filter cake was dried at 120° C. for 16 h.

The dried zeolitic material was then subjected to calcination. The zeolitic material was heated to 450° C. within 5.5 h and heated at this temperature for 2 h.

The water treatment was carried out a second time as described above. The obtained material had a $B_2O_3$:$SiO_2$ molar ratio of 0.0009, a crystallinity of 68 and a water uptake of 5.4 wt.-%. The IR spectrum of the obtained product exhibits a first absorption band with the maximum in the range of from 3701 $cm^{-1}$ to 3741 $cm^{-1}$ and a second absorption band with the maximum in the range of from 3500 $cm^{-1}$ to 3550 $cm^{-1}$, wherein the ratio of the intensity of the first absorption band relative to the intensity of the second absorption band is 2.17. The multipoint BET specific surface area determined via nitrogen adsorption at 77 K according to DIN 66131 was 229 $m^2/g$.

Results of Example 1

According to the present invention, a combination of a deboronation procedure using a liquid solvent system (water) with a treatment with a liquid aqueous system (water) was carried out. This combination, on the one hand, led to a zeolitic material having a BEA framework structure with a decreased molar ratio of $B_2O_3$:$SiO_2$ (i.e., from initially 0.045:1 to 0.0009:1), a decreased crystallinity (i.e., from initially 100% to 68%), a decreased water uptake (i.e., from initially 20.9 weight-% to 5.4 weight-%) and consequently an increased hydrophobicity. Concerning the ratio of the intensity of the first absorption band relative to the intensity of the second absorption band in the IR spectrum, said ratio of the final product of Example 1 is far higher than that of the deboronated product in Example 1-(ii), which indicates that the relative concentration of the silanol nests in the zeolitic material is considerably reduced by the treatment with a liquid aqueous system. Such a decrease in the relative concentration of internal defects (i.e., silanol nests) is highly unexpected, especially in view of the fact that the crystallinity of the zeolitic material is decreased from 77% (for the deboronated product in Example 1-(ii)) to 68% (for the final product of Example 1) after the treatment with a liquid aqueous system.

Example 2

(iii) Treatment with a Liquid Aqueous System 1600 g de-ionized water were provided in a vessel and 80 g of the deboronated zeolitic material obtained according to Example 1 (ii) having and a $B_2O_3:SiO_2$ molar ratio of less than 0.002 and a water uptake of 15 weight-% were added under stirring. The suspension was stirred for 10 min at room temperature. Thereafter, the suspension was heated at 160° C. under autogenous pressure for 13 h.

The resulting zeolitic material was separated from the suspension by filtration and washed with deionized water at room temperature. After the filtration, the filter cake was dried at 120° C. for 5 h.

The dried zeolitic material was then subjected to calcination at 450° C. for 2 h.

The treatment was carried out a second time as described above. The obtained material had a $B_2O_3:SiO_2$ molar ratio of 0.0008, a crystallinity of 64% and a water uptake of 4.3 weight-%. The IR spectrum of the obtained product exhibits a first absorption band with the maximum in the range of from 3701 $cm^{-1}$ to 3741 $cm^{-1}$ and a second absorption band with the maximum in the range of from 3500 $cm^{-1}$ to 3550 $cm^{-1}$, wherein the ratio of the intensity of the first absorption band relative to the intensity of the second absorption band is 1.8. The multipoint BET specific surface area determined via nitrogen adsorption at 77 K according to DIN 66131 was 61 $m^2/g$.

Results of Example 2

According to the present invention, a combination of a deboronation procedure using a liquid solvent system (water) with a treatment with a liquid aqueous system (water) was carried out. This combination, on the one hand, led to a zeolitic material having a BEA framework structure with a decreased molar ratio $B_2O_3:SiO_2$ (i.e., from initially 0.045:1 to 0.0008:1), a decreased crystallinity (i.e., from initially 100% to 64%), a decreased water uptake (i.e., from initially 20.9 weight-% to 4.3 weight-%) and consequently an increased hydrophobicity. Concerning the ratio of the intensity of the first absorption band relative to the intensity of the second absorption band in the IR spectrum, said ratio of the final product of Example 2, similar to the case of the final product of Example 1, is also much higher than that of the deboronated product in Example 1-(ii), which indicates that the relative concentration of the silanol nests in the zeolitic material is substantially reduced by the treatment with a liquid aqueous system. Such a decrease in the relative concentration of internal defects (i.e., silanol nests) is again unexpected in view of the fact that the crystallinity of the zeolitic material is decreased from 77% (for the deboronated product in Example 1-(ii)) to 64% (for the final product of Example 2) after the treatment with a liquid aqueous system.

Comparative Example 1: Steam Treatment

A shallow bed sample of 100 g zeolitic material obtained according to Example 1 (ii) having a $B_2O_3:SiO_2$ molar ratio of less than 0.002 and a water uptake of 15 weight-% was provided in a muffle oven and heated to 650° C. (temperature ramp 5 K/min). For the steam treatment, a gas flow of 6 L/min (10% steam in air) was used, wherein the water dosing started at 200° C. The steam-treatment was carried out for 1 h at 650° C.

The obtained material had a $B_2O_3:SiO_2$ molar ratio of 0.0014, a crystallinity of 70 and a water uptake of 13.0 weight-%. The multipoint BET specific surface area determined via nitrogen adsorption at 77 K according to DIN 66131 was 518 $m^2/g$. The IR spectrum of the product obtained after steaming exhibits a first absorption band with the maximum in the range of from 3701 $cm^{-1}$ to 3741 $cm^{-1}$ and a second absorption band with the maximum in the range of from 3500 $cm^{-1}$ to 3550 $cm^{-1}$, wherein the ratio of the intensity of the first absorption band relative to the intensity of the second absorption band is 1.42.

Thus, compared to the zeolitic material obtained according to the inventive process, although the steam treated materials more or less retain their crystallinity, the steam treatment does not have the regenerative effect relative to the internal defects in the form of silanol nests, the ratio of the first absorption band relative to the intensity of the second absorption band in the IR spectrum only slightly increasing as a result of the steam treatment regimen. Furthermore, steam treatment has little influence on the water uptake, which also remains more or less constant, only slightly decreasing, which clearly contrasts to the zeolitic materials obtained from the inventive process of which the water uptake drops to a fraction of its initial value as a result of the treatment with the liquid aqueous system in step (iii).

Comparative Example 2: Steam Treatment

A shallow bed sample of 100 g zeolitic material obtained according to Example 1 (ii) having a $B_2O_3:SiO_2$ molar ratio of less than 0.002 and a water uptake of 15 weight-% was provided in a muffle oven and heated to 850° C. (temperature ramp 5 K/min). For the steam-treatment, a gas flow of 6 L/min (10% steam in air) was used, wherein the water dosing started at 200° C. The steam-treatment was carried out for 1 h at 850° C.

The obtained material had a $B_2O_3:SiO_2$ molar ratio of 0.0016 and a water uptake of 8.1 weight-%. The multipoint BET specific surface area determined via nitrogen adsorption at 77 K according to DIN 66131 was 405 $m^2/g$. The IR spectrum of the product obtained after steaming exhibits a first absorption band with the maximum in the range of from 3701 $cm^{-1}$ to 3741 $cm^{-1}$ and a second absorption band with the maximum in the range of from 3500 $cm^{-1}$ to 3550 $cm^{-1}$, wherein the ratio of the intensity of the first absorption band relative to the intensity of the second absorption band is 1.4.

The XRD diffraction pattern of the resulting zeolitic material, however, reveals a different pattern than for zeolite beta, thus revealing that the harsh steam treatment conditions have strongly altered the zeolitic framework. Thus, the conditions employed in the present example have obviously modified the zeolitic framework such that it may not be compared with the zeolitic material obtained from the inventive process. Notwithstanding said structural modification, the resulting zeolitic material also does not display the regenerative changes which may be observed when employing the inventive process. In particular, as for Comparative Example 1, the ratio of the first absorption band relative to the intensity of the second absorption band in the IR spectrum remains practically constant. The water uptake, on the other hand, displays a slightly stronger decrease, without however achieving the results obtained in the zeolitic materials subject to a treatment with a liquid aqueous system according to step (iii) of the inventive process.

Example 3 Isopropanol Dehydration Tests

General Procedure for the Preparation of Catalyst Powders

General Procedure for the Preparation of the Catalyst

The catalyst was prepared as an extrudate before testing. 18 g water were added to 20 g dried powder in a Stephan-Werke GmbH mixer (Model No.: 0ZDe042/4s) at a mixing rate of 80 rpm. This mixture was mixed until a homogeneous mixture was obtained which took about 10 minutes. Then 4 g of Ludox AS40 and 1 g of Walocel were added and mixed until homogeneous which took about 2 minutes. Ludox® AS40 (20 weight-%) was added to the mixture as a binder, Walocel™ (5 weight-%) was added to the mixture as a lubricant. Then 2 g of water were added slowly and the paste was mixed for about 5 minutes to homogenize. This paste was then pressed in a hand press with an extrusion hole of 2 mm diameter and 10 cm length. The resulting extrudate was dried at 120° C. for 5 hours and calcined at 500° C. for 5 hours. The extrudate was then sized into split and sieved to separate a split size of from 0.5 to 0.6 mm. This size fraction was used for testing in the reactor. The sieves used were obtained from Retsch (500 micrometer sieve 60.122.000500 and 600 micrometer mm sieve 60.122.000600) both having a diameter of 200 mm and a height of 25 mm).

General Procedure for Isopropanol Dehydration

The activities of the catalysts were measured by the decomposition of isopropanol performed at atmospheric pressure. 4.0 g catalyst as prepared according to Example 3—General procedure for the preparation of the catalyst (500 to 800 micrometer split size) were placed in a U-type reactor (49.5 cm length, 0.6 cm diameter). The reactor was fixed in an adjustable furnace. A stream of nitrogen (6 l/h) was fed with isopropanol vapor (200° C.) via an HPLC pump with a pump rate of 8.021 g isopropanol per hour. To avoid the condensation of isopropanol or any reaction product, all lines from the saturator to the cryostat were heated to a temperature above 120° C. The gas reaction mixture was fed to the reactor at a weight hourly space velocity of 2.0 g/(g*h). The temperature of the furnace was kept 1 h at 200° C., 1 h at 250° C., 1 h at 300° C. and 1 h at 350° C. For each temperature, reactant and products were collected via liquefaction at 5° C. within a cryostat after passing the reactor. Reactant and products concentrations were measured by gas chromatography (Perkin Elmer Autosystem GC with a 50 m HP-1 methyl silicone capillary column and flame ionization detector).

Zeolitic Materials Tested in the Isopropanol Dehydration Tests:
- the zeolitic material obtained according to Example 1 (iii), i.e. a material having been subjected to the inventive combination of deboronation with a liquid solvent system (water) and a treatment with a liquid aqueous system (water);
- the zeolitic material obtained according to Example 1 (ii), i.e. a material having been subjected only to deboronation with a liquid solvent system (water), without the subsequent step of treatment with a liquid aqueous system; after deboronation, this material was subjected to calcination by heating to 550° C. (temperature ramp 2 K/min) and heating at this temperature for 4 h;
- the zeolitic material obtained according to Example 1 (ii), i.e. a material having been subjected only to deboronation with a liquid solvent system (water), without the subsequent step of treatment with a liquid aqueous system; after deboronation, this material was subjected to calcination by heating to 650° C. (temperature ramp 2 K/min) and heating at this temperature for 3 h.

Results of Example 3

Figure 1:
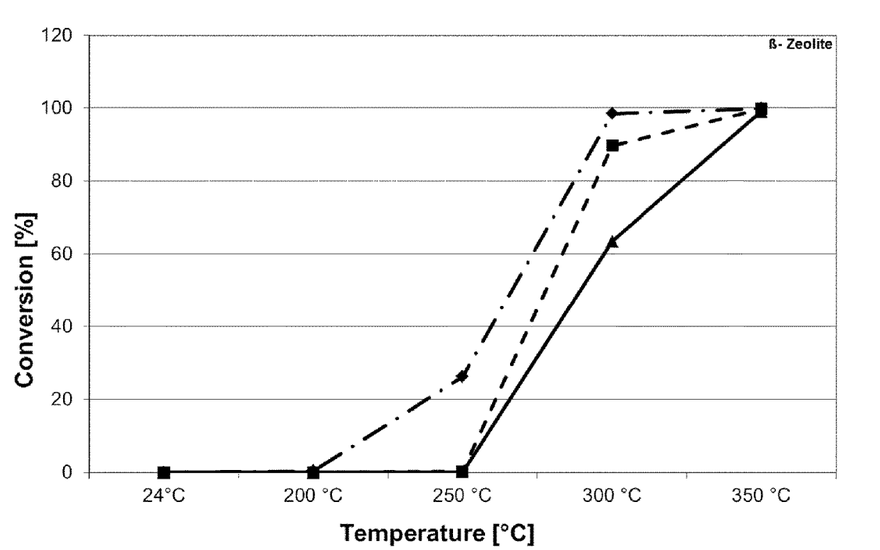
FIG. 1 shows the results of the isopropanol dehydration tests of
- the zeolitic material obtained according to the process of the present invention (Example 1 (iii)) (diamonds; -●-●-);
- the zeolitic material obtained according to Example 1 (ii), which was further subjected to calcination by heating to 550° C. (temperature ramp 2 K/min) and heating at this temperature for 4 h (squares; - - - - - );
- the zeolitic material obtained according to Example 1 (ii), which was further subjected to calcination by heating to 650° C. (temperature ramp 2 K/min) and heating at this temperature for 3 h (triangles; -).

The results discussed below are shown in FIG. 1.

An isopropanol conversion of approximately 33% is observed at a temperature of 250° C. when using the zeolitic material according to the invention obtained according to Example (iii). Furthermore, the use of this zeolitic material leads to an isopropanol conversion of about 99% at a temperature of 300° C. However, by use of the zeolitic materials obtained according to Example 1 (ii), no isopropanol conversion is detected at a temperature of 250° C. At a temperature of 300° C. an isopropanol conversion of only about 90% is observed by the zeolitic material obtained according to Example 1 (ii), which was calcined at 550° C. The use of the zeolitic material obtained according to Example 1 (ii), which was calcined at a temperature of 650° C. results in an isopropanol conversion of only about 65% at a temperature of 300° C.

Comparison of the catalyst performance at 300° C. shows that the catalyst obtained according to the invention leads to a 9% or 34% higher isopropanol conversation, respectively, compared with the catalysts which are not subjected to a treatment according to the present invention. Further, the catalyst obtained according to the invention is the only catalyst of the three tested catalysts which is able catalyzing the reaction already at a temperature of 250° C. The values of the isopropanol conversion show that the catalyst obtained by the process according to the invention, i.e. a combination of (ii) a deboronation procedure using a liquid solvent system with (iii) a treatment with a liquid aqueous system, exhibits to the best performance.

SHORT DESCRIPTION OF THE FIGURE

The x axis shows the temperature in ° C., the y axis shows the isopropanol conversion in %.

CITED LITERATURE

EP 0 013 433 A1
WO 02/057181 A2
WO 2009/016153 A2

The invention claimed is:

1. A zeolitic material, having a BEA framework structure, comprising:
YO$_2$; and
X$_2$O$_3$;
wherein
the zeolitic material has not been treated with steam or acid at a pH less than 5.5,
Y is at least one tetravalent element selected from the group consisting of Si, Sn, Ti, Zr, Ge, and
X is at least one trivalent element selected from the group consisting of Al, B, In, Ga, Fe,
a molar ratio X$_2$O$_3$:YO$_2$ is at most 0.002:1,
a water uptake of the zeolitic material is at most 7 weight-%,
an IR spectrum of the zeolitic material exhibits a first absorption band with a maximum in a range of from 3701 cm$^{-1}$ to 3741 cm$^{-1}$ and a second absorption band with a maximum in a range of from 3500 cm$^{-1}$ to 3550 cm$^{-1}$, and a ratio of an intensity of the first absorption band relative to an intensity of the second absorption band is from 1.84 to 2.6.

2. A process for the post-treatment of a-zeolitic material having a BEA framework structure to prepare the zeolitic material of claim 1, the process comprising:
(i) providing the zeolitic material having the BEA framework structure,
wherein the framework structure of the zeolitic material comprises X$_2$O$_3$ and YO$_2$,
wherein Y is a tetravalent element and X is a trivalent element and wherein a molar ratio X$_2$O$_3$:YO$_2$ is greater than 0.02:1,
wherein Y is selected from the group consisting of Si, Sn, Ti, Zr, Ge, and a combination of two or more thereof,
wherein X is selected from the group consisting of Al, B, In, Ga, Fe and a combination of two or more thereof;
(ii) treating the zeolitic material provided in (i) with a liquid solvent system thereby obtaining a zeolitic material having a molar ratio X$_2$O$_3$:YO$_2$ of at most 0.02:1, and at least partially separating the zeolitic material from the liquid solvent system,
wherein the liquid solvent system is selected from the group consisting of water, monohydric alcohols, polyhydric alcohols, and a mixture of two or more thereof; and the treatment with the liquid solvent system reduces the molar ratio X$_2$O$_3$:YO$_2$ by at least partially removing of X from the BEA framework structure:
(iii) treating the zeolitic material obtained from (ii) with a liquid aqueous system having a pH in a range of 5.5 to 8 and a temperature of at least 75° C., wherein a water content of the liquid aqueous system is greater than 50 weight-%;
wherein the pH of the aqueous system used in (iii) is determined using a pH sensitive glass electrode.

3. The process of claim 2, wherein Y is Si, and X is B.

4. The process of claim 2, wherein in (i), at least 95 weight-% of the framework structure of the zeolitic material consist of X$_2$O$_3$ and YO$_2$.

5. The process of claim 2, wherein in (i), the molar ratio X$_2$O$_3$:YO$_2$ is at least 0.03:1.

6. The process of claim 2, wherein prior to (ii), the zeolitic material provided in (i) is subjected to spray-drying.

7. The process of claim 2, wherein prior to (ii), the zeolitic material provided in (i) is subjected to calcination.

8. The process of claim 7, wherein the calcination is carried out at a temperature in a range of from 400 to 700° C. for a period in a range of from 1 to 10 h.

9. The process of claim 2, wherein in (ii), the liquid solvent system is selected from the group consisting of water, methanol, ethanol, propanol, ethane-1,2-diol, propane-1,2-diol, propane-1,3-diol, propane-1,2,3-triol, and a mixture of two or more thereof.

10. The process of claim 9, wherein in (ii), the treating is carried out at a temperature in a range of from 50 to 125° C. for a period in a range of from 6 to 20 h.

11. The process of claim 10, wherein in (ii), the treating is carried out under reflux.

12. The process of claim 2, wherein the zeolitic material obtained in (ii) has a molar ratio X$_2$O$_3$:YO$_2$ of at most 0.01:1.

13. The process of claim 2, wherein prior to (iii), the zeolitic material obtained from (ii) is subjected to spray-drying.

14. The process of claim 2, wherein the zeolitic material obtained from (ii) is in a form of a powder.

15. The process of claim 2, wherein prior to (iii), the zeolitic material provided in (ii) is subjected to calcination.

16. The process of claim 15, wherein the calcination is carried out at a temperature in a range of from 400 to 700° C. for a period in a range of from 1 to 10 h.

17. The process of claim 2, wherein in (iii), the zeolitic material is treated with the liquid aqueous system for a period in a range of from 0.5 to 24 h.

18. The process of claim 2, wherein in (iii), the zeolitic material is treated with the liquid aqueous system at a temperature in a range of from 75 to 200° C.

19. The process of claim 2, wherein the liquid aqueous system used in (iii) has a pH in a range of from 6 to 7.5.

20. The process of claim 2, wherein in (iii), a weight ratio of the liquid aqueous system relative to the zeolitic material is in a range of from 35:1 to 5:1.

21. The process of claim 2, wherein in (iii), the liquid aqueous system comprises at least 90 weight-% water.

22. The process of claim 2, wherein in (iii), the zeolitic material is treated with the liquid aqueous system in a closed system under autogenous pressure.

23. The process of claim 2, wherein the zeolitic material obtained from (iii) is subjected to calcination.

24. The process of claim 23, wherein the calcination is carried out at a temperature in a range of from 350 to 600° C. for a period in a range of from 1 to 10 h.

25. The process of claim 2, wherein after (i) and/or after (ii) and/or after (iii), the zeolitic material is, prior to calcination, subjected to drying.

26. The process of claim 2, wherein neither prior to nor during nor after (iii), the zeolitic material is subjected to steam treatment and/or wherein neither during nor after (iii), the zeolitic material is subjected to a treatment with an aqueous solution having a pH of below 5.5 or above 8.

27. The zeolitic material of claim 1, wherein the molar ratio X$_2$O$_3$:YO$_2$ is in a range of from 0.0005:1 to 0.002:1 and the water uptake is at most 6 weight-%.

28. The zeolitic material of claim 1, wherein the zeolitic material has a crystallinity, as determined by XRD analysis, of at least 60%, a specific surface area of at most 600 m$^2$/g as determined according to DIN 66131, and the ratio of the intensity of the first absorption band relative to the intensity of the second absorption band is in a range of from 1.5 to 2.5.

29. The zeolitic material of claim 1, wherein Y is Si, and wherein X is B.

30. The zeolitic material of claim 1 being in a form of a powder.

31. The zeolitic material of claim 1, which is obtained by a process comprising:
   (i) providing the zeolitic material having the BEA framework structure,
   wherein the framework structure of the zeolitic material comprises $X_2O_3$ and $YO_2$,
   wherein Y is a tetravalent element and X is a trivalent element and wherein a molar ratio $X_2O_3:YO_2$ is greater than 0.02:1,
   wherein Y is selected from the group consisting of Si, Sn, Ti, Zr, Ge, and a combination of two or more thereof,
   wherein X is selected from the group consisting of Al, B, In, Ga, Fe and a combination of two or more thereof:
   (ii) treating the zeolitic material provided in (i) with a liquid solvent system thereby obtaining a zeolitic material having a molar ratio $X_2O_3:YO_2$ of at most 0.02:1, and at least partially separating the zeolitic material from the liquid solvent system,
   wherein the liquid solvent system is selected from the group consisting of water, monohydric alcohols, polyhydric alcohols, and a mixture of two or more thereof; and the treatment with the liquid solvent system reduces the molar ratio $X_2O3:YO_2$ by at least partially removing of X from the BEA framework structure;
   (iii) treating the zeolitic material obtained from (ii) with a liquid aqueous system consisting essentially of water having a pH in a range of 5.5 to 8 and a temperature of at least 75° C.;
   wherein
   the zeolitic material is not subjected to a treatment with steam, and
   the pH of the aqueous system used in (iii) is determined using a pH sensitive glass electrode.

32. The zeolitic material of claim 1, wherein a BET surface area of the zeolitic material, having a BEA framework structure is from 60 $m^2/g$ to less than 600 $m^2/g$.

33. A catalyst, a catalyst support or a catalyst component, comprising: the zeolitic material according to claim 1.

34. A zeolitic material obtained by the process according to claim 2.

* * * * *

UNITED STATES PATENT AND TRADEMARK OFFICE
CERTIFICATE OF CORRECTION

PATENT NO. : 10,179,741 B2  
APPLICATION NO. : 14/436738  
DATED : January 15, 2019  
INVENTOR(S) : Andrei-Nicolae Parvulescu et al.

Page 1 of 1

It is certified that error appears in the above-identified patent and that said Letters Patent is hereby corrected as shown below:

In the Specification

In Column 2, Line 39, delete "0.02:1." and insert -- 0.02:1; --, therefor.

In Column 11, Line 10, delete "al" and insert -- at --, therefor.

In Column 12, Line 1, delete "autogeneous" and insert -- autogenous --, therefor.

In Column 12, Line 45, delete "ore" and insert -- or --, therefor.

In Column 15, Line 64, delete "ta" and insert -- at --, therefor.

In Column 17, Line 22, delete "propylenglycol," and insert -- propyleneglycol, --, therefor.

In Column 19, Line 37, delete "100" and insert -- 100% --, therefor.

In Column 20, Line 42, delete "68" and insert -- 68% --, therefor.

In Column 22, Line 15, delete "70" and insert -- 70% --, therefor.

In the Claims

In Column 25, Line 24 of Claim 2, delete "a-zeolitic" and insert -- a zeolitic --, therefor.

Signed and Sealed this  
Twenty-first Day of April, 2020

Andrei Iancu  
*Director of the United States Patent and Trademark Office*